(12) United States Patent
Arbuckle et al.

(10) Patent No.: US 10,324,468 B2
(45) Date of Patent: Jun. 18, 2019

(54) SYSTEM AND METHOD FOR CONTROLLING A POSITION OF A MARINE VESSEL NEAR AN OBJECT

(71) Applicant: Brunswick Corporation, Mettawa, IL (US)

(72) Inventors: Jason S. Arbuckle, Horicon, WI (US); Steven J. Andrasko, Oshkosh, WI (US); Andrew J. Przybyl, Berlin, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/818,226

(22) Filed: Nov. 20, 2017

(65) Prior Publication Data

US 2019/0155287 A1    May 23, 2019

(51) Int. Cl.
*G05D 1/02* (2006.01)
*B63H 21/21* (2006.01)
(Continued)

(52) U.S. Cl.
CPC ........... *G05D 1/0206* (2013.01); *B63H 21/21* (2013.01); *B63J 99/00* (2013.01); *B63H 2025/026* (2013.01); *B63J 2099/008* (2013.01)

(58) Field of Classification Search
CPC .................. G05D 1/0206; B63H 21/21; B63H 2025/026; B63J 2099/008
(Continued)

(56) References Cited

U.S. PATENT DOCUMENTS 2,585,502 A    2/1952  Schneider
2,775,328 A   12/1956  Yokel
              (Continued)

FOREIGN PATENT DOCUMENTS

DE      906907      3/1954
EP      0423901 A1  4/1991
            (Continued)

OTHER PUBLICATIONS

Matsuda Kazuo, "Navigation Aid by Voice Control and Guidance", Japan voyage Society Navigation, Japan, Japan voyage Society, Dec. 1996, No. 130, pp. 17-23, ISSN: 2189-8073 (online), 0919-9985 (print) (Year: 1996).*
(Continued)

*Primary Examiner* — Yazan A Soofi
(74) *Attorney, Agent, or Firm* — Andrus Intellectual Property Law, LLP

(57) ABSTRACT

A method and system for controlling a position of a marine vessel near an object are disclosed. A location sensor determines a location of the marine vessel, and a speed sensor determines a speed of the marine vessel. A control module is in signal communication with the location sensor and the speed sensor. A marine propulsion system is in signal communication with the control module. The control module determines if the marine vessel is within a predetermined range of the object based on the marine vessel's location. In response to determining that the marine vessel is within the predetermined range of the object, the control module controls the propulsion system to produce at least one of a braking linear thrust and a braking moment to counter current movement of the marine vessel.

19 Claims, 5 Drawing Sheets

(51) Int. Cl.
*B63H 25/02* (2006.01)
*B63J 99/00* (2009.01)

(58) Field of Classification Search
USPC .......................................................... 701/21
See application file for complete search history.

(56) References Cited

U.S. PATENT DOCUMENTS

| | | | |
|---|---|---|---|
| 3,187,704 A | 6/1965 | Shatto et al. | |
| 3,673,553 A | 6/1972 | Miura et al. | |
| 3,688,252 A | 8/1972 | Thompson | |
| 3,707,717 A | 12/1972 | Frielinghaus | |
| 3,715,571 A | 2/1973 | Braddon | |
| 3,771,483 A | 11/1973 | Spencer | |
| 4,009,678 A | 3/1977 | North | |
| 4,220,111 A | 9/1980 | Krautkremer et al. | |
| 4,253,149 A * | 2/1981 | Cunningham | G05D 1/0206 318/588 |
| 4,428,052 A | 1/1984 | Robinson et al. | |
| 4,513,378 A | 4/1985 | Antkowiak | |
| 4,519,335 A | 5/1985 | Krautkremer et al. | |
| 4,691,659 A | 9/1987 | Ito et al. | |
| 4,769,773 A | 9/1988 | Shatto, Jr. | |
| 4,939,661 A | 7/1990 | Barker et al. | |
| 4,975,709 A | 12/1990 | Koike | |
| 5,031,561 A | 7/1991 | Nilsson | |
| 5,090,929 A | 2/1992 | Rieben | |
| 5,108,325 A | 4/1992 | Livingston et al. | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,735,718 A | 4/1998 | Ekwall | |
| 5,736,962 A | 4/1998 | Tendler | |
| 5,755,605 A | 5/1998 | Asberg | |
| 5,884,213 A | 3/1999 | Carlson | |
| 5,995,527 A | 11/1999 | Ueta et al. | |
| 6,059,226 A | 5/2000 | Cotton et al. | |
| 6,092,007 A | 7/2000 | Cotton et al. | |
| 6,142,841 A | 11/2000 | Alexander et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,308,651 B2 | 10/2001 | McKenney et al. | |
| 6,354,892 B1 | 3/2002 | Staerzl | |
| 6,357,375 B1 | 3/2002 | Ellis | |
| 6,377,889 B1 | 4/2002 | Soest | |
| 6,386,930 B2 | 5/2002 | Moffet | |
| 6,431,928 B1 | 8/2002 | Aarnivuo | |
| 6,446,003 B1 | 9/2002 | Green et al. | |
| 6,447,349 B1 | 9/2002 | Fadeley et al. | |
| 6,485,341 B1 | 11/2002 | Lanyi et al. | |
| 6,511,354 B1 | 1/2003 | Gonring et al. | |
| 6,604,479 B2 | 8/2003 | McKenney et al. | |
| 6,623,320 B1 | 9/2003 | Hedlund | |
| 6,677,889 B2 | 1/2004 | Van Rees et al. | |
| 6,678,589 B2 | 1/2004 | Robertson et al. | |
| 6,705,907 B1 | 3/2004 | Hedlund | |
| 6,707,414 B2 | 3/2004 | Van Rees et al. | |
| 6,712,654 B1 | 3/2004 | Putaansuu | |
| 6,757,606 B1 | 6/2004 | Gonring | |
| 6,848,382 B1 | 2/2005 | Bekker | |
| 6,978,729 B2 | 12/2005 | Bertetti et al. | |
| 6,994,046 B2 | 2/2006 | Kaji et al. | |
| 6,995,527 B2 | 2/2006 | Depasqua | |
| RE39,032 E | 7/2006 | Gonring et al. | |
| 7,131,385 B1 | 11/2006 | Ehlers et al. | |
| 7,220,153 B2 | 5/2007 | Okuyama | |
| 7,261,605 B2 | 8/2007 | Misao et al. | |
| 7,267,068 B2 | 8/2007 | Misao et al. | |
| 7,268,703 B1 * | 9/2007 | Kabel | G01C 21/203 340/984 |
| 7,305,928 B2 | 12/2007 | Bradley et al. | |
| 7,366,593 B2 | 4/2008 | Fujimoto et al. | |
| 7,389,735 B2 | 6/2008 | Kaji et al. | |
| 7,398,742 B1 | 7/2008 | Gonring | |
| 7,416,458 B2 | 8/2008 | Suemori et al. | |
| 7,429,202 B2 | 9/2008 | Yazaki et al. | |
| 7,455,557 B2 | 11/2008 | Mizutani | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,727,036 B1 | 6/2010 | Poorman et al. | |
| 7,813,844 B2 | 10/2010 | Gensler et al. | |
| 7,876,430 B2 | 1/2011 | Montgomery | |
| 7,883,383 B2 | 2/2011 | Larsson | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,417,399 B2 | 4/2013 | Arbuckle et al. | |
| 8,439,800 B1 | 5/2013 | Bazan et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,622,778 B2 | 1/2014 | Tyers et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,797,141 B2 | 8/2014 | Best et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,114,865 B1 | 8/2015 | Gonring | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,176,215 B2 | 11/2015 | Nikitin et al. | |
| 9,195,234 B2 | 11/2015 | Stephens | |
| 9,248,898 B1 | 2/2016 | Kirchhoff et al. | |
| 9,359,057 B1 | 6/2016 | Andrasko et al. | |
| 9,377,780 B1 | 6/2016 | Arbuckle et al. | |
| 9,676,464 B2 | 6/2017 | Johnson et al. | |
| 9,694,885 B2 | 7/2017 | Combee | |
| 9,927,520 B1 | 3/2018 | Ward et al. | |
| 10,053,193 B2 * | 8/2018 | Nachem | B63B 21/04 |
| 2003/0137445 A1 * | 7/2003 | Van Rees | B63C 1/04 342/41 |
| 2003/0191562 A1 | 10/2003 | Robertson et al. | |
| 2004/0221787 A1 | 11/2004 | McKenney et al. | |
| 2005/0075016 A1 | 4/2005 | Bertetti et al. | |
| 2005/0170713 A1 | 8/2005 | Okuyama | |
| 2006/0089794 A1 | 4/2006 | Depasqua | |
| 2006/0116796 A1 | 6/2006 | Fossen et al. | |
| 2007/0017426 A1 | 1/2007 | Kaji et al. | |
| 2007/0032923 A1 | 2/2007 | Mossman et al. | |
| 2007/0089660 A1 | 4/2007 | Bradley et al. | |
| 2007/0162207 A1 | 7/2007 | Shimo et al. | |
| 2007/0178779 A1 | 8/2007 | Takada et al. | |
| 2007/0203623 A1 | 8/2007 | Saunders et al. | |
| 2007/0233389 A1 | 10/2007 | Stephens | |
| 2008/0033603 A1 | 2/2008 | Gensler et al. | |
| 2008/0289558 A1 | 11/2008 | Montgomery | |
| 2009/0037040 A1 | 2/2009 | Salmon et al. | |
| 2009/0171520 A1 | 7/2009 | Kaji | |
| 2009/0276148 A1 | 11/2009 | Ardvisson | |
| 2010/0023192 A1 | 1/2010 | Rae et al. | |
| 2010/0076683 A1 * | 3/2010 | Chou | B60R 1/00 701/301 |
| 2010/0109944 A1 | 5/2010 | Whitehead et al. | |

(56) References Cited

U.S. PATENT DOCUMENTS

| | | |
|---|---|---|
| 2010/0138083 A1 | 6/2010 | Kaji |
| 2010/0145558 A1 | 6/2010 | Kaji |
| 2011/0153126 A1 | 6/2011 | Arbuckle et al. |
| 2011/0166724 A1 | 7/2011 | Hiramatsu |
| 2012/0072059 A1 | 3/2012 | Glaeser |
| 2012/0129410 A1* | 5/2012 | Tyers ............... B63H 21/21 440/1 |
| 2012/0248259 A1 | 10/2012 | Page et al. |
| 2013/0080044 A1* | 3/2013 | Tyers ............... B63H 21/21 701/301 |
| 2013/0297104 A1 | 11/2013 | Tyers et al. |
| 2015/0089427 A1 | 3/2015 | Akuzawa |
| 2015/0277442 A1 | 10/2015 | Ballou |
| 2015/0346722 A1 | 12/2015 | Herz et al. |
| 2015/0346730 A1 | 12/2015 | Stephens et al. |
| 2016/0101838 A1 | 4/2016 | Kojima |
| 2016/0125739 A1 | 5/2016 | Stewart et al. |
| 2016/0246300 A1 | 8/2016 | Langford-Wood |
| 2016/0252907 A1 | 9/2016 | Parkinson |
| 2016/0334792 A1 | 11/2016 | Jopling |
| 2017/0205828 A1 | 7/2017 | Estabrook |
| 2017/0205829 A1* | 7/2017 | Tyers ............... G05D 1/0206 |
| 2017/0210449 A1 | 7/2017 | Frisbie et al. |
| 2017/0253314 A1* | 9/2017 | Ward ............... B63H 25/04 |
| 2017/0255200 A1 | 9/2017 | Arbuckle et al. |
| 2017/0277189 A1 | 9/2017 | Johnson et al. |
| 2017/0349257 A1 | 12/2017 | Hara et al. |
| 2017/0365175 A1 | 12/2017 | Harnett |
| 2018/0015994 A1 | 1/2018 | Kishimoto et al. |
| 2018/0017974 A1* | 1/2018 | Tyers ............... G05D 1/0206 |
| 2018/0057132 A1* | 3/2018 | Ward ............... B63H 21/213 |

FOREIGN PATENT DOCUMENTS

| | | | |
|---|---|---|---|
| EP | 2161542 A1 | 3/2010 | |
| GB | 1173442 | 12/1969 | |
| GB | 2180374 | 3/1987 | |
| JP | 58061097 | 4/1983 | |
| JP | 04101206 A | 2/1992 | |
| JP | 05-203638 A | 8/1993 | |
| JP | 6286694 A * | 10/1994 | ............. B63H 25/42 |
| JP | 07223591 | 8/1995 | |
| JP | 2926533 B2 | 7/1997 | |
| JP | 11-129978 A | 5/1999 | |
| JP | 2002173091 A | 6/2002 | |
| JP | 2003276677 A | 10/2003 | |
| JP | 2004042884 A | 2/2004 | |
| JP | 2006137309 A | 6/2006 | |
| JP | 2007248336 A | 9/2007 | |
| JP | 2008201225 A | 9/2008 | |
| JP | 2009-227035 A | 10/2009 | |
| JP | 2009-241738 A | 10/2009 | |
| JP | 2009-538782 A | 11/2009 | |
| JP | 2011128943 A | 6/2011 | |
| JP | 5042906 B2 | 7/2012 | |
| JP | 2012528417 A | 11/2012 | |
| JP | 5226355 B2 | 7/2013 | |
| JP | 2014065495 A | 4/2014 | |
| JP | 2017159887 A * | 9/2017 | ............. B63H 25/04 |
| KR | 20060072293 A | 6/2006 | |
| WO | 9205505 A1 | 4/1992 | |
| WO | 2006058400 A1 | 6/2006 | |
| WO | WO 2008111249 | 9/2008 | |
| WO | 2016104031 A1 | 6/2016 | |
| WO | WO 2018073731 | 4/2018 | |

OTHER PUBLICATIONS

Oda Hiroyuki et al, "New Berthing Support System (NBSS) Using High Accuracy Differential GPS—Application to Safety Navigation Management", Japan Maritime Engineering Society of Japan, Japan Maritme Engineering Society, Jan. 2009, vol. 44, No. 1, pp. 64-69, ISSN: 1884-3778 (online) (Year: 2009).*

Otsu Kohei "Operating system of the ship and information control engineering", System / Control / Information, Japan, System Control Information Society, 2003, vol. 47, No. 7, pp. 336-342, ISSN: 2424-1806 (online), 0916-1600 (print) (Year: 2003).*

Ward et al., "Methods for Controlling Movement of a Marine Vessel Near and Object," Unpublished U.S. Appl. No. 15/986,395, filed May 22, 2018.

Arbuckle et al., "System and Method for Controlling a Position of a Marine Vessel Near an Object," U.S. Appl. No. 15/818,233, filed Nov. 20, 2017.

Arbuckle et al., "Station Keeping and Waypoint Tracking Methods", Unpublished U.S. Appl. No. 15/416,359.

Heap et al., "Systems and Methods for Automatically Trailering a Marine Vessel on a Boat Trailer", Unpublished U.S. Appl. No. 15/377,612, filed Dec. 13, 2016.

Ward et al., "Methods for Controlling Movement of a Marine Vessel Near an Object", Unpublished U.S. Appl. No. 15/246,681, filed Aug. 25, 2016.

Ward et al., "Marine Vessel Station Keeping Systems and Methods", Unpublished U.S. Appl. No. 15/138,860, filed Apr. 26, 2016.

Ward et al, "Method and System for Close Proximity Collision Detection", U.S. Appl. No. 14/807,217, filed Jul. 23, 2015.

Poorman et al, "Multilayer Control System and Method for Controlling Movement of a Marine Vessel", U.S. Appl. No. 11/965,583, filed Dec. 27, 2007.

Andrasko et al., "System and Method for Controlling Handling of a Marine Vessel", U.S. Appl. No. 14/484,702, filed Sep. 12, 2014.

Mercury Marine, Axius Generation 2 Installation Manual, Jul. 2010, pp. 22-25.

Mercury Marine, Joystick Piloting for Outboards Operation Manual, 2013, pp. 24-26.

Mercury Marine, Zeus 3000 Series Pod Drive Models Operation Manual, 2013, pp. 49-52.

Trolley Scan (PTY) Ltd, "RFID-Radar—How it Works," web article, web page accessed Oct. 3, 2016, available at http://www.rfidradar.com/howworks.html.

Open CV, "Detection of ArUco Markers," web article, Dec. 18, 2015, web page last accessed Nov. 29, 2016, available at http://docs.opencv.org/3.1.0/d5/dae/tutorial_aruco_detection.html.

Extended European Search Report in corresponding European Application No. 18206217.4, mailed Mar. 25, 2019.

* cited by examiner

SYSTEM AND METHOD FOR CONTROLLING A POSITION OF A MARINE VESSEL NEAR AN OBJECT

FIELD

The present disclosure relates to systems and methods for controlling movement and position of a marine vessel in a body of water.

BACKGROUND

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

Unpublished U.S. patent application Ser. No. 15/138,860, filed Apr. 26, 2016, discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

Unpublished U.S. patent application Ser. No. 15/246,681, filed Aug. 25, 2016, discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

Unpublished U.S. patent application Ser. No. 15/377,612, filed Dec. 13, 2016, discloses a system for automatically trailering a marine vessel, including a set of coded tags coupled to a boat trailer, each storing data regarding its location on the trailer. A tag reader is located aboard the vessel, and estimates a first distance to a first coded tag in the set and a second distance to a second coded tag in the set. A position determination module uses the first and second estimated distances to determine position and heading of the vessel and the trailer in a given coordinate system. A feedback control module calculates a difference between the positions of the vessel and the trailer and a difference between the headings of the vessel and the trailer and determines vessel movements required to minimize the position and heading differences. A marine propulsion system automatically actuates a propulsion device to produce the required vessel movements to propel the vessel onto the trailer.

Unpublished U.S. patent application Ser. No. 15/416,359, filed Jan. 26, 2017, discloses a method for controlling movement of a marine vessel, including controlling a propulsion device to automatically maneuver the vessel along a track including a series of waypoints, and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point that is at or near the stopover waypoint.

The above patents and applications are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for controlling a position of a marine vessel near an object is disclosed. The system includes a location sensor that determines a location of the marine vessel and a speed sensor that determines a speed of the marine vessel. A control module is in signal communication with the location sensor and the speed sensor. A marine propulsion system is in signal communication with the control module. The control module determines if the marine vessel is within a predetermined range of the object based on the marine vessel's location. In response to determining that the marine vessel is within the predetermined range of the object, the control module controls the propulsion system to produce at least one of a braking linear thrust and a braking moment to counter current movement of the marine vessel.

Another example of the present disclosure is of a method for controlling a position of a marine vessel near an object, the marine vessel being powered by a marine propulsion system. The method includes determining a location of the marine vessel, determining a speed of the marine vessel, determining a direction of travel of the marine vessel, and determining a direction of rotation of the marine vessel. A control module determines if the marine vessel is within a predetermined range of the object based on the marine vessel's location. The control module also determines at least one of (a) a direction of a braking linear thrust based on the marine vessel's direction of travel, and (b) a direction of a braking moment based on the marine vessel's direction of rotation. In response to the marine vessel being within the predetermined range of the object, the control module automatically controls the propulsion system to produce at least one of the braking linear thrust and the braking moment to counter current movement of the marine vessel.

BRIEF DESCRIPTION OF THE DRAWINGS

Examples of systems and methods for controlling a position of a marine vessel are described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed.

FIGS. 1-6 schematically depict a marine vessel and a control system for orienting and maneuvering the marine vessel. It should be understood that the particular configuration of the marine vessel, propulsion system, and control system shown and described is exemplary. It is possible to apply the concepts described in the present disclosure with substantially different configurations therefor. For example, the marine vessel that is depicted has two marine propulsion devices. However, it should be understood that the concepts of the present disclosure are applicable to marine vessels having any number of marine propulsion devices. Additionally, although the present disclosure describes the propulsion devices as being outboard motors, other arrangements such as an inboard arrangements, stern drive arrangements, pod arrangements, etc. using propellers, impellers, jets, or the like can be controlled according to the same principles and methods. The control system described herein includes certain operational structures such as global positioning system (GPS) devices and inertial measurement units (IMUs). It should be understood that the concepts of the present disclosure are capable of being implemented with different types of systems for acquiring global position data and are not limited to the specific types and numbers of such devices described and depicted herein. Further, the present disclosure describes certain types of user input devices. It should also be recognized that the concepts disclosed in the present disclosure are applicable in a preprogrammed format without user input, or in conjunction with different types of user input devices, as known to one of skill in the art. Further equivalents, alternatives and modifications are possible as would be recognized by those skilled in the art.

Figure 1:
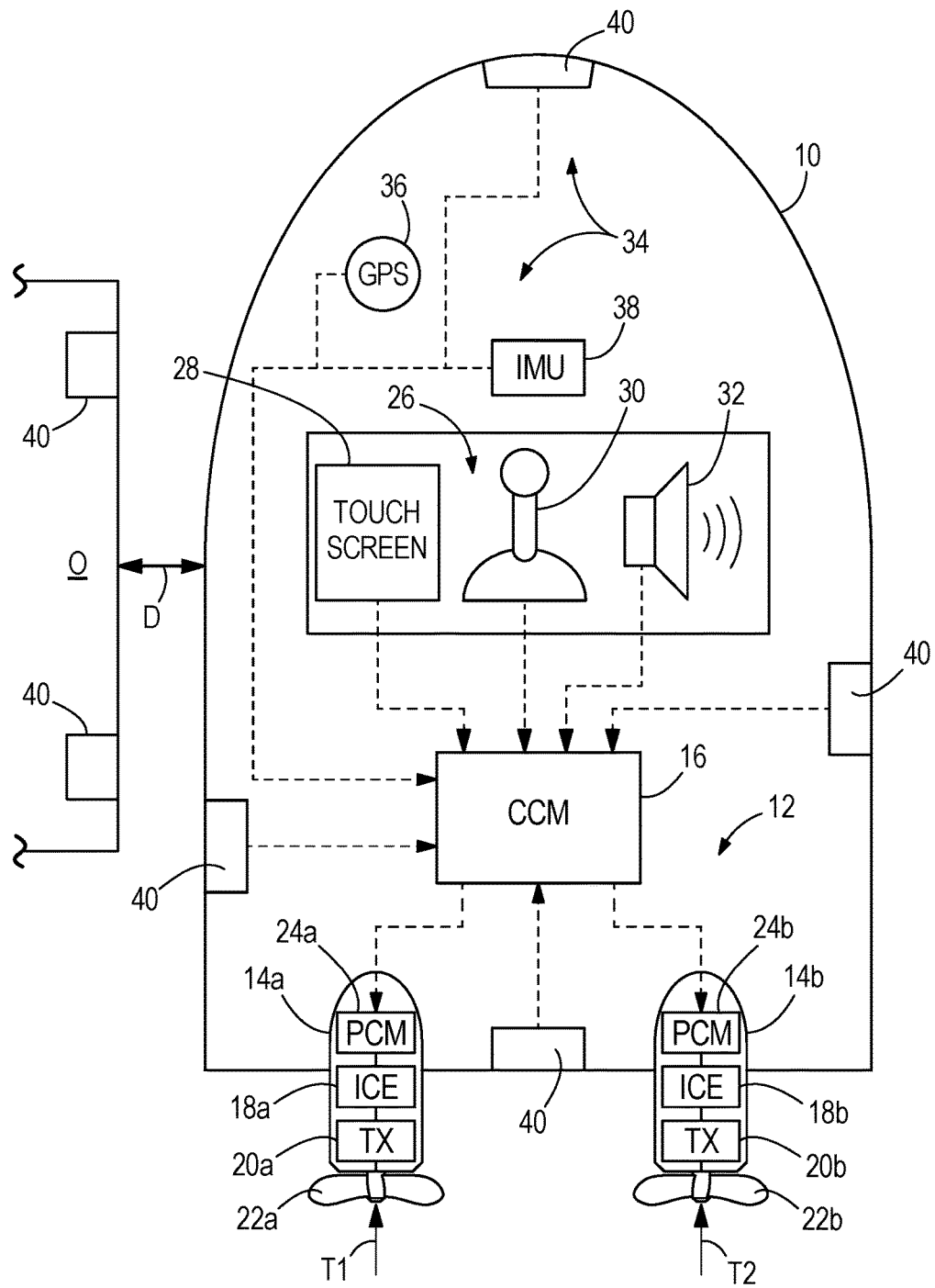
FIG. 1 is a schematic representation of a control system on a marine vessel.

A schematic of an exemplary marine vessel 10 is provided in FIG. 1. The marine vessel 10 includes a marine propulsion system 12 including two marine propulsion devices 14a, 14b. The marine propulsion system 12 is in signal communication with a control module 16. The control module 16 (here, shown as a command control module or "CCM") controls the magnitudes of thrusts T1, T2 of the propulsion devices 14a, 14b, such as by controlling speed of their internal combustion engines 18a, 18b and thus their propellers 22a, 22b. The control module 16 also controls shift positions of the propulsion devices 14a, 14b between forward, neutral, and reverse by way of transmissions 20a, 20b. The control module 16 also controls the steering angles of the propulsion devices 14a, 14b, which affect the angles of their thrusts T1, T2 with respect to an imaginary centerline of the marine vessel 10 running from bow to stern (see 42, FIGS. 3 and 4). The steering angles and shift positions of the propulsion devices 14a, 14b can be controlled directly by the control module 16, or can be controlled by way of separate propulsion control modules ("PCM") 24a, 24b provided for each propulsion device 14a, 14b.

A command console 26 on the marine vessel 10 includes an electronic display screen, such as the touch screen 28 shown herein. Note that in other embodiments, the display screen may additionally or alternatively be associated with a keypad and may not be capable of receiving touch inputs. The touch screen 28 may provide the operator of the marine vessel 10 with the ability to select one or more modes in which to operate the marine vessel 10, such as, but not limited to, an auto-docking mode, which will be described further herein below. A joystick 30 is also provided at the command console 26 and can provide steering commands, shift commands, and thrust commands to the propulsion devices 14a, 14b via the control module 16, as is known. Although not shown herein, in other examples, a steering wheel is provided for inputting steering commands to the propulsion device 14a, 14b, and a pair of throttle/shift levers is provided for inputting shift commands to the transmissions 20a, 20b and engine speed commands to the engines 18a, 18b, as is also known. An audio output device 32, such as a horn, buzzer, loudspeaker, or other device capable of producing sound, is also provided at the command console 26 and in signal communication with the control module 16.

The marine vessel 10 includes numerous sensors, including a location sensor that determines a location of the marine vessel 10, a speed sensor that determines a speed of the marine vessel 10, a direction sensor that senses a direction of travel of the marine vessel 10, and a rotational sensor that senses a direction of rotation of the marine vessel 10. In one example, the location sensor is provided on the marine vessel 10. In fact, the marine vessel 10 can be provided with multiple location sensors 34, such as a global positioning system (GPS) receiver 36, an inertial measurement unit (IMU) 38, and several proximity sensors and/or vision-based sensors 40. In one example, the GPS receiver 36 serves as each of the location sensor, the speed sensor, and the direction sensor. The GPS receiver 36 provides to the control module 16 a current, actual geographic location of the marine vessel 10 in latitude and longitude. The GPS receiver 36 can also serve as the speed sensor, as it determines the speed of the marine vessel 10 over ground ("SOG") by determining how far the marine vessel 10 travels, as determined from GPS position, over a given period of time. The control module 16 may use an average or filtered value of SOG as being the vessel's speed. In other examples, a pitot tube or paddle wheel type speed sensor may be included. The GPS receiver 36 can also act as the direction sensor, as it determines the course over ground (COG) of the marine vessel 10 based on changing geographical location. The IMU 38 may alternatively or additionally serve as the direction sensor, as it detects a current, actual heading of the marine vessel 10. In other examples, the direction sensor is a simple compass. The IMU 38 may also act as the rotational sensor, as it is capable of detecting a change in heading over time, otherwise known as yaw rate or angular velocity. The IMU 38 can be, for example, part 8M0048162 available from Mercury Marine of Fond du Lac, Wis. In certain embodiments of the IMU 38, it comprises a differential correction receiver, accelerometers, angular rate sensors, and a microprocessor which manipulates the information obtained from these devices to provide information relating to the current position of the marine vessel 10, in terms of longitude and latitude, the current heading of the marine vessel 10 with respect to north, and the velocity and acceleration of the marine vessel 10 in six degrees of freedom. In some examples, the location sensor, speed sensor, direction sensor, and rotational sensor are part of a single device, such as an attitude and heading reference system (AHRS). As shown, the control module 16 is in signal communication with the location sensor(s) 34 and the speed sensor(s) (e.g., GPS receiver 36).

Although one proximity sensor and/or vision-based sensor 40 is shown on each of the bow, stern, and port and starboard sides of the marine vessel 10, fewer or more sensors could be provided at each location. Note too that the proximity and/or vision-based sensors 40 could be provided on the object O instead of (or in addition to) being provided on the marine vessel 10. These sensors 40 could communicate with the control module 16 wirelessly. The sensors 40 are used as location sensors, and for example could be radars, sonars, LiDAR devices, cameras, lasers, Doppler direction finders, or other devices individually capable of determining both the relative location and distance of an object O, such as a dock, seawall, slip, buoy, shoreline, large rock or tree, etc., with respect to the marine vessel 10, and vice versa. In some examples, the proximity sensors can be RFID receivers, and RFID tags can be placed on the object O or on the marine vessel 10, as appropriate, at strategic positions. In other embodiments, the RFID receivers may instead be radio frequency identification and geometry (RFIG) units, which determine location, poise, motion, and orientation information using photovoltaic components and IR-LEDs on the receiver's integrated circuit. The vision-based sensors can be cameras. The control module 16 can be programmed with a computer vision algorithm that allows it to interpret photographs or video from the cameras. The algorithms can detect the location and basic contours of the object O or the marine vessel 10, as appropriate. Alternatively, ArUco markers could be provided at strategic locations on the object O or the marine vessel 10, and the algorithms could detect the location of the ArUco markers. For example, the camera sensor(s) would determine the scale and orientation of the ArUco markers and could thereafter determine their 3-D locations from a 2-D image.

The proximity and/or vision-based sensors 40 may be provided at locations on the marine vessel 10 and/or object O other than those shown herein. Fewer or more proximity and/or vision-based sensors 40 than shown can also be provided. The proximity and/or vision-based sensors 40 can all be of the same type, or can be of varied types. Ideally, the object O or marine vessel 10 has enough physical variance, and the sensors 40 are placed at locations that exhibit this variance, such that a three-dimensional picture can be provided to the proximity and/or vision-based sensors 40, and the control module 16 can tell one part of the object O or marine vessel 10 from another part of the object O or marine vessel 10. Note that if many proximity sensors are used, the data they provide can be used to create a virtual map or virtual photograph of the nearby object O or the marine vessel 10.

Relative position and bearing data from the proximity and/or vision-based sensors 40 can be used in order to provide measurement resolution and accuracy much higher than that of the GPS receiver 36. For example, SOG from the GPS receiver 36 is noisy at low speeds, seeing as GPS location does not change much over time when the marine vessel 10 is moving slowly. The proximity and/or vision-based sensors 40 could therefore be used to determine vessel speed at low speeds, such as by regularly measuring a distance D between the marine vessel 10 and the object O, and calculating a change in the measured distance D over time. In one example, the control module 16 chooses to use data from the proximity and/or vision-based sensors 40 if the proximity and/or vision-based sensors 40 sense the object O within a given range of the marine vessel 10, or vice versa. If the proximity and/or vision-based sensors 40 are on the marine vessel 10, the given range may be measured from the center of gravity of the marine vessel 10, from the outer edge of the hull, or from the proximity and/or vision-based sensor 40 nearest the object O, depending on system calibration.

The control module 16 is programmable and includes a processing system and a storage system. The control module 16 can be located anywhere on the marine vessel 10 and/or located remote from the marine vessel 10 and can communicate with various components of the marine vessel 10 via a peripheral interface and wired and/or wireless links. Although FIG. 1 shows several control modules (CCM 16, PCMs 24a, 24b), the marine vessel 10 can include only one control module. Portions of the method disclosed herein below can be carried out by a single control module or by several separate control modules. If more than one control module is provided, each can control operation of a specific device or sub-system on the marine vessel 10. For example, the PCMs 24*a*, 24*b* can interpret and carry out commands from the CCM control module 16 in order to produce the thrusts T1, T2, rotate the propulsion devices 14*a*, 14*b* to different steering angles, change the speed of the engines 18*a*, 18*b*, and change shift positions via the transmissions 20*a*, 20*b*. In alternative embodiments, the command control module 16 directly controls these functions of the propulsion devices 14*a*, 14*b*.

In some examples, the control module 16 may include a computing system that includes a processing system, storage system, software, and an input/output (I/O) interface for communicating with peripheral devices. The systems may be implemented in hardware and/or software that carries out a programmed set of instructions. For example, the processing system loads and executes software from the storage system, such as software programmed with an auto-docking method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 16 communicates with one or more of the components on the marine vessel 10 via the I/O interface and a communication link. In one example, the communication link is a controller area network (CAN) bus, but other types of links could be used. The I/O interface allows the control module 16 to interact with both input devices, such as the touch screen 28, joystick 30, GPS receiver 36, IMU 38, and proximity and/or vision based sensors 40, as well as with output devices such as the touch screen 28, audio output device 32, and the propulsion devices 14*a*, 14*b*. Other types of devices can be provided in signal communication with the control module 16, such as keyboards, remote controls, voice command receivers, keypads, buttons, etc., any of which may be part of the command console 26.

Figure 2:
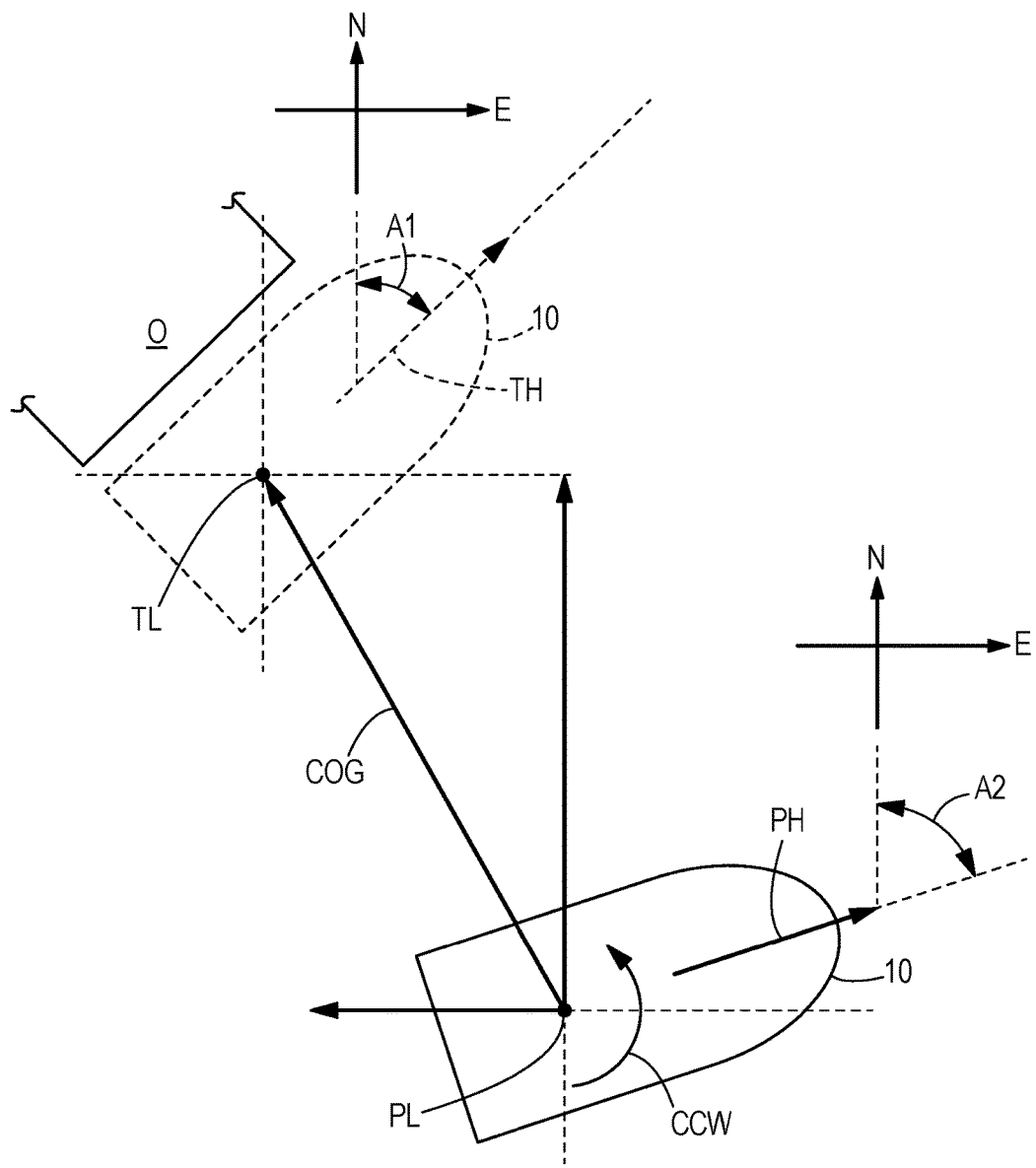
FIG. 2 is a schematic used to explain how the marine vessel can be moved from a current location to a target location.

Referring to FIG. 2, in an auto-docking mode, the control module 16 controls the propulsion system 12 to reduce a difference between the marine vessel's location as determined by the GPS receiver 36 and a predetermined target location proximate the object O. The marine vessel 10 can be moved to a predetermined target global position (defined by latitude and longitude) and to a predetermined target heading by way of an algorithm that controls the vessel's propulsion devices 14*a*, 14*b* to drive the vessel's position error and heading error to zero. The target location TL and target heading TH can be input by the operator via the touch screen 28, such as by selecting the target location from a user-interactive map and inputting the target heading as a numerical value or by way of a finger swipe. The target heading TH and target location TL can be saved for later recall by the press of a button or selection of the auto-docking mode, especially in the instance where the marine vessel 10 is frequently docked near the same object O. In the example of FIG. 2, the present location PL of a preselected point on the marine vessel 10, as determined by the GPS receiver 36, is not equal to the predetermined target location TL, and thus the control module 16 will calculate a course over ground (COG) that the marine vessel 10 must travel to reach the target location TL. Additionally, a predetermined target heading TH is at angle A1 from north, while the present heading PH read from the compass or the IMU 38 is at angle A2 from north. The control module 16 will therefore determine that a counterclockwise yaw movement (arrow CCW) of A2−A1 degrees is required to orient the marine vessel 10 at the target heading TH.

The control module 16 determines how much propulsive action to take according to a three-dimensional (left/right, fore/aft, and yaw) proportional, integral, and derivative (PID) control algorithm performed by a feedback controller of the control module 16. The feedback controller computes a desired force in the forward/back and left/right directions with reference to the marine vessel 10, along with a desired yaw moment relative to the marine vessel 10, in order to null the error elements. The computed force and moment elements are then transmitted to the marine propulsion system 12, which delivers the requested forces and moments by positioning the independently steerable propulsion devices 14*a*, 14*b*, controlling the power provided to the propellers 22*a*, 22*b* of each device, and controlling the thrust vector directions of both devices via the transmissions 20*a*, 20*b*. Such automatic changing of the position and heading of the marine vessel 10 can be achieved according to the principles described in U.S. Pat. No. 7,305,928, which was incorporated by reference herein above.

Figure 4:
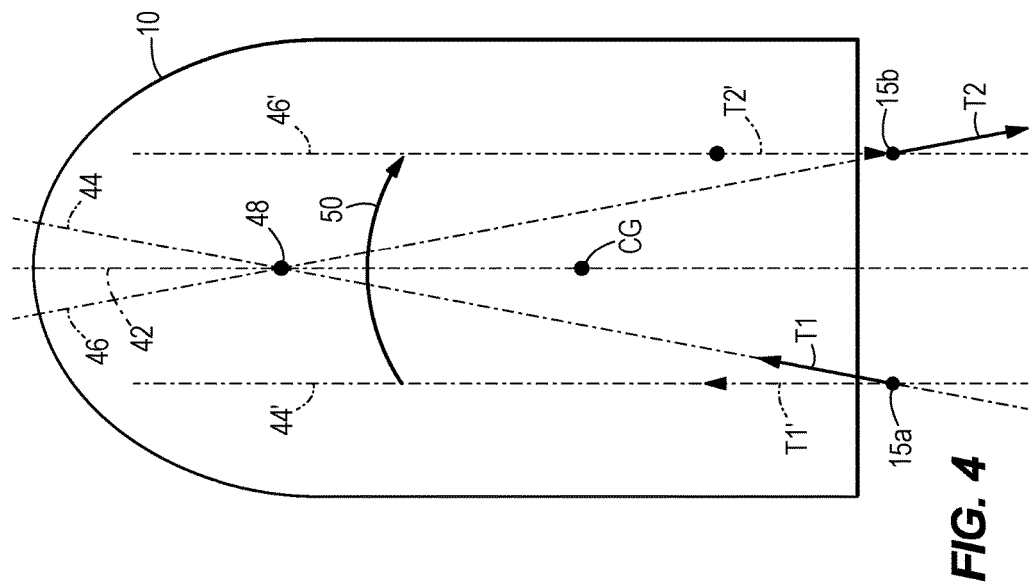
FIGS. 3 and 4 illustrate arrangements of thrust vectors used to achieve a particular movement of the marine vessel.
Figure 3:
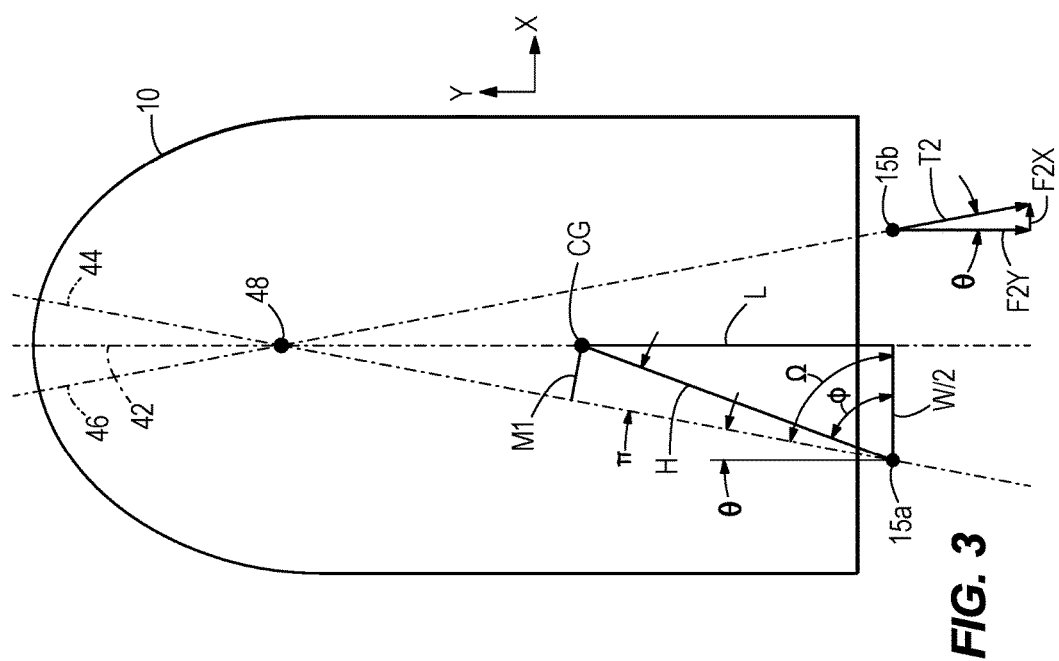

As illustrated in FIGS. 3 and 4, when a rotation of the marine vessel 10 is desired in combination with linear movement, the propulsion devices 14*a*, 14*b* are rotated about their respective steering axes 15*a*, 15*b* to steering angles θ with respect to a centerline 42 of the marine vessel 10 so that their thrust vectors intersect at a point on the centerline 42. Although thrust vector T1 is not shown in FIG. 3 for purposes of clarity (see FIG. 4 for its magnitude and direction), its associated line of action 44 is shown intersecting with a line of action 46 of thrust vector T2 at a point 48. Because the point 48 is not coincident with the center of gravity CG of the marine vessel 10, an effective moment arm M1 exists with respect to the thrust T1 produced by the propulsion device 14a. The moment about the center of gravity CG is equivalent to the magnitude of the thrust vector T1 multiplied by dimension M1. Moment arm M1 is perpendicular to dashed line 44 along which the first thrust vector T1 is aligned. As such, it is one side of a right triangle which also comprises a hypotenuse H. It should also be understood that another right triangle in FIG. 3 comprises sides L, W/2, and the hypotenuse H. So long as the propulsion devices 14a, 14b are rotated about their respective steering axes 15a, 15b by the same angle θ, a moment arm M2 (not shown for purposes of clarity) of equal magnitude to moment arm M1 would exist with respect to the second thrust vector T2 directed along dashed line 46.

With continued reference to FIG. 3, those skilled in the art will recognize that the length of the moment arm M1 can be determined as a function of steering angle θ; angle Φ; angle π; the distance between the first and second steering axes 15a and 15b, which is equal to W in FIG. 3; and the perpendicular distance L between the center of gravity CG and a line extending between the first and second steering axes 15a, 15b. The length of the line extending between the first steering axis 15a and the center of gravity CG is the hypotenuse H of a right triangle and can easily be determined using the Pythagorean theorem given L and W, which are known and saved in the control module's memory. The magnitude of θ is calculated as described herein below with respect to equations 1-4. The magnitude of angle Ω is 90-θ. The magnitude of angle Φ is equivalent to the arctangent of the ratio of length L to the distance between the first steering axis 15a and the vessel's centerline 42, which is identified as W/2. The length of the moment arm M1 can be mathematically determined by the control module 16 using the length of line H and the magnitude of angle π (which is Ω-Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 3 shows the vector components of the second thrust vector T2. As illustrated, second thrust vector T2 is oriented along dashed line 46, which is at steering angle θ with respect to the centerline 42. The second thrust vector T2 can be resolved into components, parallel and perpendicular to centerline 42, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the propulsion system 12 can be calculated by adding the respective forward/reverse and left/right vector components of T1 and T2:

$$FX = T1(\sin(\theta)) + T2(\sin(\theta)) \quad (1)$$

$$FY = T1(\cos(\theta)) - T2(\cos(\theta)) \quad (2)$$

Note that in the example of FIGS. 3 and 4, T1 has positive vector components in both the X and Y directions, while T2 has a positive vector component in the X direction and a negative vector component in the Y direction, which is therefore subtracted from the Y-directed vector component of T1. The net thrust acting on the marine vessel 10 can be determined by vector addition of FX and FY.

Turning to FIG. 4, a moment (represented by arrow 50) can also be imposed on the marine vessel 10 to cause it to rotate about its center of gravity CG. The moment 50 can be imposed in either rotational direction: clockwise (CW) or counterclockwise (CCW). The rotating force resulting from the moment 50 can be applied either in combination with a linear force on the marine vessel 10 or alone. In order to combine the moment 50 with a linear force, the first and second thrust vectors T1, T2 are aligned in generally opposite directions with their respective lines of action 44, 46 intersecting at the point 48 illustrated in FIG. 4. Although the construction lines are not shown in FIG. 4, effective moment arms M1, M2 exist with respect to the first and second thrust vectors T1, T2 and the center of gravity CG. Therefore, a moment is exerted on the marine vessel 10 as represented by arrow 50. If the thrust vectors T1, T2 are equal to each other in magnitude, are exerted along lines 44 and 46 respectively, and are symmetrical about the centerline 42 and in opposite directions, the net component forces parallel to the centerline 42 are equal to each other and therefore no net linear force is exerted on the marine vessel 10 in the forward/reverse direction. However, the first and second thrust vectors T1, T2 also resolve into forces perpendicular to the centerline 42, which in this example are additive. As a result, the marine vessel 10 in FIG. 4 will move to the right as it rotates in a clockwise direction in response to the moment 50.

If, on the other hand, it is desired that the moment 50 be the only force on the marine vessel 10, with no lateral movement in the forward/reverse or left/right directions, alternative first and second thrust vectors, represented by T1' and T2' in FIG. 4, are aligned parallel to each other along dashed lines 44' and 46', which are parallel to the centerline 42. The first and second thrust vectors T1', T2' are of equal magnitude and opposite direction. As a result, no net force is exerted on the marine vessel 10 in a forward/reverse direction. Because angle θ for both thrust vectors T1' and T2' is equal to 0 degrees, no resultant force is exerted on the marine vessel 10 in a direction perpendicular to the centerline 42. As a result, a rotation of the marine vessel 10 about its center of gravity CG is achieved with no linear movement in either the forward/reverse or the left/right directions.

With reference to FIGS. 3 and 4, it can be seen that virtually any type of movement, including translation and rotation, of the marine vessel 10 can be accomplished to achieve the target location TL and target heading TH. If forward translation with no rotation is needed, the propulsion devices 14a, 14b are oriented so that their thrust vectors align in a forward parallel orientation, and so long as the magnitude and direction of T1 are equal to that of T2, the marine vessel 10 will travel in a forward direction. If, on the other hand, a rotation about the center of gravity CG is requested, the first and second thrust vectors T1, T2 are directed along lines 44 and 46 that do not intersect at the center of gravity CG, but instead intersect at another point 48 along the centerline 42. As shown in FIGS. 3 and 4, this intersection point 48 can be forward from the center of gravity CG. The thrusts T1 and T2 shown in FIG. 4 result in a clockwise rotation (shown by moment 50) of the marine vessel 10. Alternatively, if the propulsion devices 14a, 14b were rotated so that their thrusts intersected at a point along the centerline 42 that was behind the center of gravity CG, an opposite effect could be realized, all else being equal. It should also be recognized that, with an intersection point 48 forward of the center of gravity CG, the directions of the first and second thrust vectors T1, T2 could be reversed to cause a rotation of the marine vessel 10 in a counterclockwise direction.

It should be noted that the steering angles of the propulsion devices 14a, 14b need not be the same. For example, the propulsion device 14a can be steered to angle θ1 with respect to the centerline 42, while the second propulsion device 14b can be steered to angle θ2. After the control module 16 has calculated a location difference and a heading difference based on comparison of the present and target locations and the present and target headings as described herein above with respect to FIG. 2, the control module 16 will determine the net thrust and the net moment desired of the propulsion system 12 based on a map stored in its memory that correlates a given desired linear and/or rotational movement with a total target linear thrust and a total target moment about a preselected point. It can be seen, therefore, that T1, T2, θ1, and θ2 can thereafter be calculated by the control module 16 using the geometric relationships described hereinabove according to the following equations:

$$FX = T1(\sin(\theta 1)) + T2(\sin(\theta 2)) \quad (1)$$

$$FY = T1(\cos(\theta 1)) - T2(\cos(\theta 2)) \quad (2)$$

$$MCW = (W/2)(T1(\cos(\theta 1))) + (W/2)(T2(\cos(\theta 2))) \quad (3)$$

$$MCCW = L(T1(\sin(\theta 1))) + L(T2(\sin(\theta 2))) \quad (4)$$

$$MT = MCW - MCCW \quad (5)$$

where FX and FY are the vector components of the known target linear thrust, MT is the known total target moment (including clockwise moment MCW and counterclockwise moment MCCW) about the preselected point, and L and W/2 are also known as described above. The control module 16 then solves for the four unknowns (T1, T2, θ1, and θ2) using the four equations, thereby determining the steering angles, shift positions, and thrust magnitudes of each propulsion device 14a, 14b that will achieve the desired movement of the marine vessel 10. Note that equations 1-5 are particular to the thrust arrangements shown in FIGS. 3 and 4, and different vector components would contribute to clockwise or counterclockwise rotation and to forward/reverse or right/left translation given thrusts in different directions.

Through research and development, the present inventors have discovered that it is helpful to stop the momentum of the marine vessel 10 when it reaches its predetermined target location (TL, FIG. 2) proximate an object O, such as, but not limited to, a dock. Stopping the momentum of the marine vessel 10 allows the operator to pull the marine vessel 10 into a slip and stop at the target location TL with greater accuracy. According to the present disclosure, when the algorithm described herein determines that the marine vessel 10 is at the predetermined target location TL, the control module 16 takes one last reading of velocity and automatically applies a shift event in a direction opposite that in which the marine vessel 10 approached the object O, in order to stop the momentum of the marine vessel 10. The control module 16 determines that the marine vessel 10 is at the target location TL based on information from any combination of the above-mentioned location sensors 34, including at least one of the GPS receiver 36 and the proximity and/or vision-based sensors 40. Once the control module 16 has determined that the marine vessel 10 is at the target location TL proximate the object O, the control module 16 causes the propulsion system 12 to shift into a direction opposite that at which the marine vessel 10 approached the object O for a predetermined length of time. The length of time is calibratable and can be determined from an input-output map, such as a lookup table, given the input(s) of the last reading of velocity and/or a measured distance between the marine vessel 10 and the object O. For example, the input-output map may return a longer length of time for higher velocities and a shorter length of time for lower velocities. The control module 16 may cause the audio output device 32 to emit a sound upon conclusion of the controlled, timed shift event.

Figure 5:
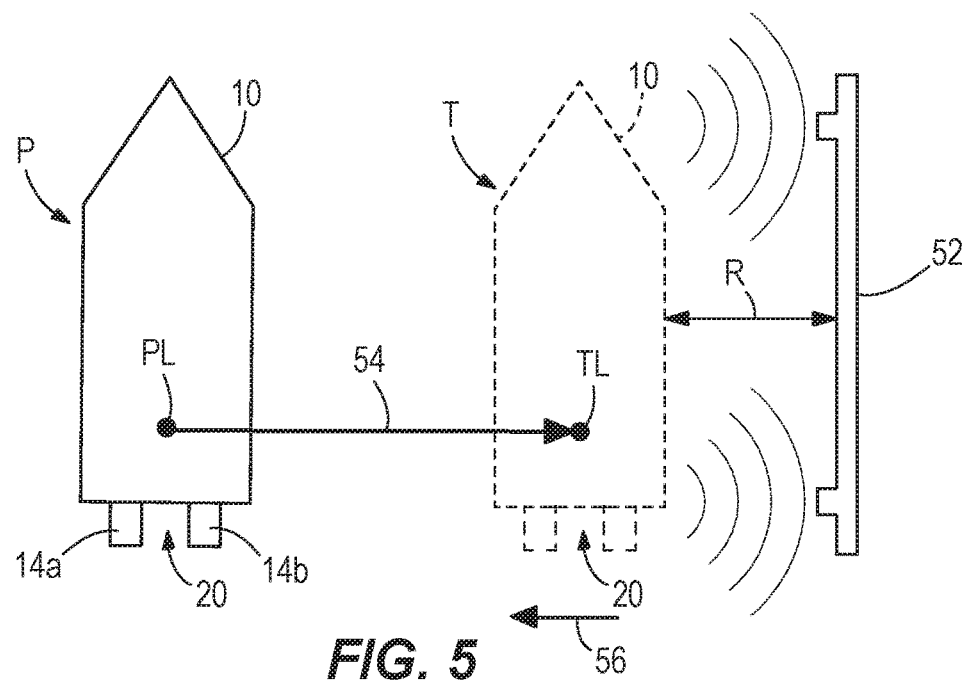
FIG. 5 shows one example of a marine vessel approaching an object
Figure 6:
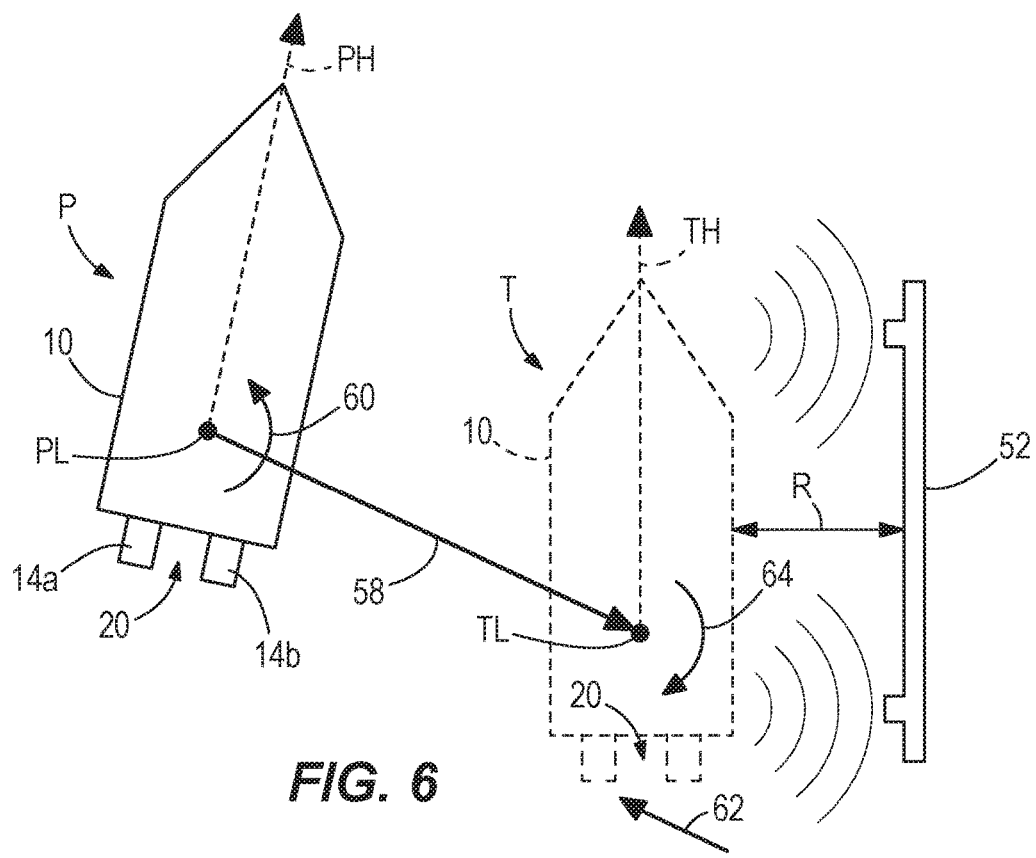
FIG. 6 shows another example of a marine vessel approaching an object.

FIGS. 5 and 6 show two different examples of the marine vessel 10 approaching an object O such as the dock 52 shown herein. In the example of FIG. 5, the marine vessel 10 moves from a present position/orientation as shown in solid lines at P to a target position/orientation as shown in dashed lines at T. Note that the present location PL need not be the initial, starting position of the marine vessel 10, but could instead be an intermediate position of the marine vessel 10 during an auto-docking procedure, at which the marine vessel 10 is located while approaching the dock 52. In this example, in order to move from the present location PL to the target location TL, the marine vessel 10 must move along the vector 54, in order that the predetermined location on the marine vessel (here, the center of gravity CG) moves from the present location PL to the target location TL.

The control module 16 is programmed to determine if the marine vessel 10 is within a predetermined range R of the object O (here, the dock 52) based on the marine vessel's location. In one example, the control module 16 can be pre-programmed with the GPS coordinates of a particular target location TL near the dock 52, which target location TL is at the predetermined range R from the dock 52. The control module 16 may determine that the marine vessel 10 is within the predetermined range R of the object O when the current, actual GPS location of the marine vessel 10 is equal to the target location TL. In another example, while the control module 16 controls the propulsion system 12 to reduce the difference between the marine vessel's location as determined by the GPS receiver 36 and the predetermined target location TL proximate the object O, the control module 16 determines if the marine vessel 10 is within the predetermined range R of the object O based on the marine vessel's location as determined by at least one of the proximity sensor(s) and the vision-based sensor(s) 40. As mentioned herein above, the proximity and/or vision based sensors 40 may have greater accuracy at close range than does the GPS receiver 36. Thus, the proximity and/or vision-based sensors 40 may more accurately report when the marine vessel 10 is within the predetermined range R of the dock 52. In other words, although the marine vessel 10 may initially be controlled to the target location TL using information from the GPS receiver 36, the control module 16 may use information from the proximity and/or vision-based sensors 40 to determine when the marine vessel 10 is within the predetermined range R of the object O.

The predetermined range R may be calibrated and stored in the memory of the control module 16 for use by the present maneuvering algorithm. In other examples, the predetermined range R may depend on the speed of the marine vessel 10 and/or the mode in which the propulsion system 12 is operating, in which case the predetermined range R may be determined from a lookup table or similar input-output map. In other examples, the operator could input a desired predetermined range R via the touch screen 28 or other interactive display located at the command console 26, such as by selection or input of a numerical value, or by way of the operator selecting a GPS location nearby a dock from a virtual map. Note that if the GPS receiver 36 is used to determine that the marine vessel 10 is at the target location TL and the marine vessel 10 is therefore within the predetermined range R of the object O, the predetermined range R might be pre-defined as being between the location of the GPS receiver 36 and the nearest edge of the object O, or the control module 16 may be programmed to take into account the geometry (such as the width) of the marine vessel 10 in order to determine if a side of the marine vessel 10 is within the predetermined range R of the nearest edge of the object O. If the proximity and/or vision-based sensors 40 are used to determine that the marine vessel 10 is within the predetermined range R of the object O, depending on the number and location(s) of the sensors 40 and the size of the object O, the control module 16 may need to calculate a lateral distance between the marine vessel 10 and the object O based on the measured distance of the object O from the sensor 40 and the angle at which the object O is situated with respect to the sensor 40. The same principle can be used if the proximity and/or vision-based sensors 40 are provided on the object O for locating the marine vessel 10.

In response to determining that the marine vessel 10 is within the predetermined range R of the object O, the control module 16 controls the propulsion system 12 to produce at least one of a braking linear thrust and a braking moment to counter the current movement of the marine vessel 10. More specifically, the control module 16 determines a direction of the braking linear thrust as being opposite the marine vessel's direction of travel. For example, with respect to FIG. 5, because the marine vessel 10 traveled along vector 54 to move from the present location PL to the target location TL, the control module 16 would determine the braking linear thrust as being in a direction opposite that of the vector 54. Here, the total braking linear thrust is shown by arrow 56. The control module 16 can determine the individual thrusts required to be produced by the propulsion devices 14a, 14b of the propulsion system 12 by way of the algorithms described herein above, wherein the total braking linear thrust 56 resulting from such individual thrusts T1, T2 is in a purely linear direction to the left with no fore/aft movement and no rotation.

In this example, the direction sensor, such as the GPS receiver 36 sensing COG, would report the direction of travel of the marine vessel 10 along vector 54 to the control module 16, and the control module 16 would set the direction of the braking linear thrust 56 as being directly opposite the reported direction of travel. In another example, instead of the direction sensor and the sensed direction of travel of the marine vessel 10 being used to determine the direction of the braking linear thrust 56, the control module 16 instead uses a reported gear state of each propulsion device 14a, 14b (as reported by a gear state sensor associated with each transmission 20a, 20b) and a reported steering angle of each propulsion device 14a, 14b (as reported by a steering angle sensor associated with each device) in order to produce the exact opposite resulting total thrust vector. For example, if the propulsion device 14a had been at angle θ1 and in forward gear and the propulsion device 14b had been at angle θ2 and in reverse gear in order to produce the movement along vector 54, the control module 16 may shift the propulsion device 14a into reverse gear and the propulsion device 14b into forward gear, while maintaining their respective steering angles at θ1 and θ2. Doing so would, according to the principles described herein above, produce a resultant braking linear thrust 56 in the exact opposite direction of that shown by vector 54.

FIG. 6 illustrates an example in which the marine vessel 10 is at a present location PL and a present heading PH, as shown by the solid lines, and thereafter moves to a target location TL and a target heading TH, as shown by dashed lines. To accomplish such movement, the control module 16 utilizes the algorithms described herein above to translate the marine vessel 10 as shown by the vector 58 and to rotate the marine vessel 10 as shown by the moment 60. In this example, the control module 16 is programmed to calculate not only a braking linear thrust to counter current movement in the direction of vector 58, but also a braking moment to counter the moment 60 that was induced in order to rotate the marine vessel 10 to the target heading TH. Similar to the example described with respect to FIG. 5, the control module 16 will produce a braking linear thrust 62 that counters the movement along vector 58 required to move the marine vessel 10 from the present location PL to the target location TL. This braking linear thrust 62 could be calculated by the control module 16 sensing a direction of travel of the marine vessel 10 by way of the direction sensor and setting a direction of the braking linear thrust as being opposite the marine vessel's direction of travel, or could be produced by the control module 16 reversing the sensed gear states of the transmissions 20a, 20b, both of which methods were described herein above with respect to FIG. 5. Similarly, in the example of FIG. 6, the control module 16 may use a reading from the rotational sensor, such as the compass or the IMU 38, in order to determine a direction of rotation of the marine vessel 10 as it moved from the present heading PH to the target heading TH. The control module 16 may then set the direction of the braking moment 64 as being opposite the marine vessel's sensed direction of rotation (see moment 60). For example, if the marine vessel 10 had yawed in a counterclockwise direction to reach the target heading TH, the braking moment would be in the clockwise direction, and vice versa. The control module 16 could recalculate the thrusts, gear states, and steering angles of the propulsion devices 14a, 14b required to produce the braking moment 64, or as also described herein above with respect to FIG. 5, could sense the gear states of the propulsion devices 14a, 14b and briefly reverse those gear states in order to produce the oppositely-directed braking moment 64.

According to the present disclosure, the control module 16 may control the propulsion system 12 to produce the at least one of the braking linear thrust and the braking moment for a length of time. The control module 16 may determine the length of time based on the marine vessel's speed, which speed can then be input into an input-output map or an equation to determine the length of time. For example, the above-described speed sensors may sense at least one of a linear velocity and an angular velocity of the marine vessel 10. The length of time for which the control module 16 produces the braking linear thrust depends on the linear velocity, such as determined by the reading of SOG from the GPS receiver 36. The length of time for which the control module 16 produces the braking moment depends on the angular velocity, such as the yaw rate reported by the IMU 38. The input-output map, such as a lookup table, may include predetermined time values that are saved in the memory of the control module 16. The vessel speed and the predetermined values may be related such that the length of time is directly related to the marine vessel's speed, whether that speed is the linear velocity or the angular velocity. The direct relationship could be a linear relationship, an exponential relationship, or any other type of direct relationship. In another example, although the length of time may generally increase as the marine vessel's speed increases, the relationship between the length of time and the vessel's speed may not be easily described by a mathematical relationship, and rather, each pair of input and output values may be calibrated based on testing of the marine vessel 10 at various speeds. In yet another example, the length of time for which the reverse control action is taken depends not only on vessel speed but also on a measured distance D (FIG. 1) between the marine vessel 10 and the object O. The measured distance D may be measured in response to the control module 16 determining that the marine vessel 10 is within the predetermined range R of the object O. Note that the measured distance D may be less than the predetermined range R due to the GPS receiver 36 not being as precise at close range or because the proximity and/or vision-based sensors 40 may not recognize immediately when the marine vessel 10 comes within the predetermined range R of the object O. This could be due to the placement of the sensors 40 on the marine vessel 10 with respect to the object O (or vice versa), and/or due to processing delays while the control module 16 interprets the information from the sensors 40 and compares the reported distance from the object O to the predetermined range R.

According to the present algorithms, the control module 16 may be programmed to produce a given magnitude of the braking linear thrust and/or braking moment. This magnitude can be based on the vessel's speed as measured immediately before the marine vessel 10 reached a target location TL and came within the predetermined range R of the object O. Alternatively, the magnitude of the braking linear thrust and/or moment could be the same as the magnitude of the respective linear thrust and/or moment used to propel and rotate the marine vessel 10 to the target location TL and target heading TH. In still another example, the magnitude(s) could be whatever is produced by opening the throttle valves of the engines 18a, 18b to positions that are just greater than an idle position. In yet another example, the magnitude(s) could be whatever is produced by maintaining the throttle valves in the idle positions, but shifting the transmissions 20a, 20b to gears that are opposite those to which they had previously been shifted.

As described above, the audio output device 32, which is in signal communication with the control module 16, may emit a sound in response to a command from the control module 16. For example, the control module 16 may cause the audio output device 32 to emit a sound in response to expiration of the length of time, determined as described above. In the event that both a braking linear thrust and a braking moment are required to be produced to stop the vessel's momentum, and the length of time for which the braking linear thrust is produced is different from the length of time for which the braking moment is produced, the control module 16 may not send a signal to the audio output device 32 to produce the sound until after the longer of the two lengths of time has expired. The sound, which can be a buzz, a voice alert, a bell, a beep, or any other audio output, signals to the operator of the marine vessel 10 that the auto-docking sequence is finished. Thus, the audio output device 32 should not be activated until after all reverse control actions, whether they are braking linear thrusts or braking moments, have been completed. The operator is then informed by the sound that it is safe to hop off the marine vessel 10 and onto the dock 52. In other examples, emission of sound from the audio output device 32 is accompanied by illumination of a light at the command console 26 and/or an alert that appears on the touch screen 28 to indicate that the auto-docking procedure is complete. In still other examples, no sound is provided, and only a visual indication signifies that the auto-docking procedure has ended.

Figure 7:
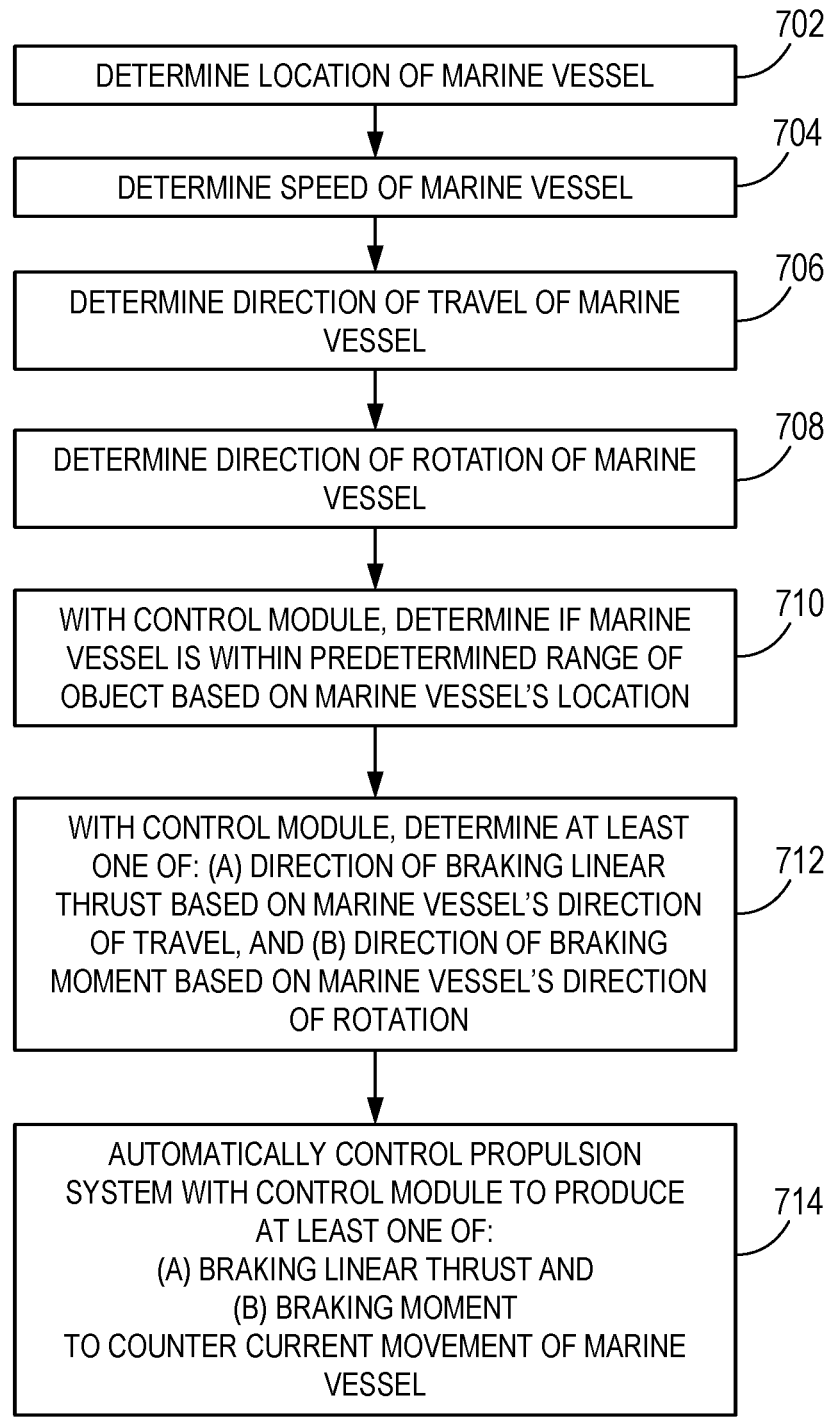
FIG. 7 illustrates a method according to the present disclosure.

A method according to the present disclosure is described with respect to FIG. 7. As shown at box 702, the method for controlling the position of the marine vessel 10 near an object O includes determining a location of the marine vessel 10. For example, the method may include determining the marine vessel's location using at least one of the GPS receiver 36 and the proximity sensor and/or vision-based sensor 40. As shown at box 704, the method includes determining a speed of the marine vessel 10, such as by way of a speed sensor, including but not limited to the GPS receiver 36 that calculates SOG. Alternatively, the method may include determining the marine vessel's speed using distances between the marine vessel 10 and the object O measured by the proximity sensors 40. The control module 16 can calculate the vessel's speed as a change in the measured distance D over time. As shown at box 706, the method includes determining a direction of travel of the marine vessel 10, such as by way of the GPS receiver 36 sensing COG or the IMU 38 sensing heading. As shown at box 708, the method includes determining a direction of rotation of the marine vessel 10, such as by obtaining a yaw rate from a compass or the IMU 38. As shown at box 710, the method includes determining, with the control module 16, if the marine vessel 10 is within the predetermined range R of the object O based on the marine vessel's location. The vessel's location can be determined by the GPS receiver 36 and/or the proximity and/or vision-based sensors 40, as described herein above.

As shown at box 712, the method also includes determining, with the control module 16, at least one of (a) a direction of a braking linear thrust based on the marine vessel's direction of travel, and (b) a direction of a braking moment based on the marine vessel's direction of rotation. This can be accomplished by way of the methods described herein above with respect to FIGS. 5 and 6. As shown at box 714, in response to the marine vessel 10 being within the predetermined range R of the object O, the method includes automatically controlling the propulsion system 12 with the control module 16 to produce at least one of the braking linear thrust and the braking moment to counter the current movement of the marine vessel 10. The control module 16 may produce both the braking linear thrust and the braking moment in the event that the marine vessel 10 both translated linearly and rotated in order to reach the target location TL and target heading TH. Alternatively, the control module 16 may choose to produce only the braking linear thrust or the braking moment, depending on which force on the marine vessel 10 was of greater magnitude as the marine vessel 10 approached the target location TL and the target heading TH. The method may include setting, with the control module 16, a direction of the braking linear thrust as being opposite the marine vessel's direction of travel, and setting, with the control module 16, a direction of the braking moment as being opposite the marine vessel's direction of rotation.

The method may also include controlling the propulsion system 12 with the control module 16 to produce the at least one of the braking linear thrust and the braking moment for a length of time, and determining the length of time with the control module 16 based on the marine vessel's speed. The method may include determining at least one of the linear velocity of the marine vessel 10 and the angular velocity of the marine vessel 10, and the length of time for which the control module 16 produces the braking linear thrust may depend on the linear velocity, while the length of time for which the control module 16 produces the braking moment may depend on the angular velocity. In either instance, the length of time may be directly related to the marine vessel's speed. In some examples, the method may include measuring a distance between the marine vessel 10 and the object O in response to the control module 16 determining that the marine vessel 10 is within the predetermined range R of the object O, and determining the length of time based also on the measured distance. The method may then include emitting a sound via the audio output device 32 in response to expiration of the length of time.

As described herein above, the method may also include operating the marine vessel 10 in an auto-docking mode, in which the control module 16 controls the propulsion system 12 to reduce a difference between the marine vessel's present location PL as determined by the GPS receiver 36 and a predetermined target location TL near the object O. The method may also include determining if the marine vessel 10 is within the predetermined range R of the object O based on the marine vessel's location as determined by at least one of the proximity sensor and the vision-based sensor 40.

Note that the control module 16 may require that the marine vessel 10 be travelling at below a predetermined threshold velocity before the algorithm can be carried out. Note also that the marine vessel 10 may float a bit even after the braking linear thrust or the braking moment is produced. However, the marine vessel 10 will nonetheless stop closer to the target location TL and target heading TH after production of the braking thrust and/or moment than if the braking thrust and/or moment had not been produced. The braking linear thrust and the braking moment could be produced by a single arrangement of the propulsion device 14a, 14b, which single arrangement causes the propulsion system 12 to produce both the braking linear thrust and the braking moment at once. Alternatively, the control module 16 might schedule production of the fore/aft, left/right, and yaw braking forces to be carried out in succession. In either instance, the control module 16 may determine different lengths of time for which to carry out the control actions based on the vessel's linear and angular velocities.

The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

What is claimed is:

1. A system for controlling a position of a marine vessel near an object, the system comprising:
    a location sensor that determines a location of the marine vessel;
    a speed sensor that determines a speed of the marine vessel;
    a direction sensor that senses a direction of travel of the marine vessel;
    a rotational sensor that senses a direction of rotation of the marine vessel;
    a control module in signal communication with the location sensor, the speed sensor, the direction sensor, and the rotational sensor; and
    a marine propulsion system in signal communication with the control module;
    wherein the control module determines that the marine vessel is within a predetermined range of the object based on the marine vessel's location;
    wherein in response to determining that the marine vessel is within the predetermined range of the object, the control module controls the propulsion system to produce at least one of a braking linear thrust and a braking moment to counter current movement of the marine vessel;
    wherein the control module sets a direction of the braking linear thrust as being opposite the marine vessel's direction of travel; and
    wherein the control module sets a direction of the braking moment as being opposite the marine vessel's direction of rotation.

2. The system of claim 1, wherein the control module controls the propulsion system to produce the at least one of the braking linear thrust and the braking moment for a length of time; and
    wherein the control module determines the length of time based on the marine vessel's speed.

3. The system of claim 2, further comprising an audio output device in signal communication with the control module;
    wherein the control module causes the audio output device to emit a sound in response to expiration of the length of time.

4. The system of claim 2, wherein the length of time is directly related to the marine vessel's speed.

5. The system of claim 2, wherein the speed sensor senses at least one of a linear velocity and an angular velocity of the marine vessel;
    wherein the length of time for which the control module produces the braking linear thrust depends on the linear velocity; and
    wherein the length of time for which the control module produces the braking moment depends on the angular velocity.

6. The system of claim 1, wherein the location sensor comprises at least one of a global positioning system (GPS) receiver, a proximity sensor, and a vision-based sensor.

7. The system of claim 6, wherein the control module is operable in an auto-docking mode, in which the control module controls the propulsion system to reduce a difference between the marine vessel's location as determined by the GPS receiver and a predetermined target location proximate the object; and
    wherein the control module determines that the marine vessel is within the predetermined range of the object based on the marine vessel's location as determined by at least one of the proximity sensor and the vision-based sensor.

8. The system of claim 1, further comprising a global positioning system (GPS) receiver, wherein the GPS receiver serves as each of the location sensor, the speed sensor, and the direction sensor.

9. The system of claim 1, wherein the propulsion system produces both the braking linear thrust and the braking moment simultaneously.

10. A method for controlling a position of a marine vessel near an object, the marine vessel being powered by a marine propulsion system, the method comprising:
    determining a location of the marine vessel;
    determining a speed of the marine vessel;
    determining a direction of travel of the marine vessel;

determining a direction of rotation of the marine vessel;

determining, with a control module, that the marine vessel is within a predetermined range of the object based on the marine vessel's location;

determining, with the control module, at least one of (a) a direction of a braking linear thrust based on the marine vessel's direction of travel, and (b) a direction of a braking moment based on the marine vessel's direction of rotation;

setting, with the control module, the direction of the braking linear thrust as being opposite the marine vessel's direction of travel;

setting, with the control module, the direction of the braking moment as being opposite the marine vessel's direction of rotation; and in response to the marine vessel being within the predetermined range of the object, automatically controlling the propulsion system with the control module to produce at least one of the braking linear thrust and the braking moment to counter current movement of the marine vessel.

11. The method of claim 10, further comprising controlling the propulsion system with the control module to produce the at least one of the braking linear thrust and the braking moment for a length of time; and determining the length of time with the control module based on the marine vessel's speed.

12. The method of claim 11, further comprising emitting a sound via an audio output device in response to expiration of the length of time.

13. The method of claim 11, wherein the length of time is directly related to the marine vessel's speed.

14. The method of claim 11, further comprising measuring a distance between the marine vessel and the object in response to the control module determining that the marine vessel is within the predetermined range of the object; and determining the length of time based also on the measured distance.

15. The method of claim 11, further comprising determining at least one of a linear velocity of the marine vessel and an angular velocity of the marine vessel;

wherein the length of time for which the control module produces the braking linear thrust depends on the linear velocity; and wherein the length of time for which the control module produces the braking moment depends on the angular velocity.

16. The method of claim 10, further comprising determining the marine vessel's location using at least one of a global positioning system (GPS) receiver, a proximity sensor, and a vision-based sensor.

17. The method of claim 16, further comprising operating the marine vessel in an auto-docking mode, in which the control module controls the propulsion system to reduce a difference between the marine vessel's location as determined by the GPS receiver and a predetermined target location near the object; and determining that the marine vessel is within the predetermined range of the object based on the marine vessel's location as determined by at least one of the proximity sensor and the vision-based sensor.

18. The method of claim 16, further comprising determining the marine vessel's speed using at least one of the GPS receiver and the proximity sensor.

19. The method of claim 10, further comprising producing both the braking linear thrust and the braking moment simultaneously.

* * * * *